United States Patent
Du et al.

(10) Patent No.: US 11,263,929 B2
(45) Date of Patent: Mar. 1, 2022

(54) FLEXIBLE DISPLAY APPARATUS

(71) Applicant: BOE TECHNOLOGY GROUP CO., LTD., Beijing (CN)

(72) Inventors: Shuang Du, Beijing (CN); Paoming Tsai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 256 days.

(21) Appl. No.: 16/449,256

(22) Filed: Jun. 21, 2019

(65) Prior Publication Data

US 2019/0392737 A1   Dec. 26, 2019

(30) Foreign Application Priority Data

Jun. 26, 2018   (CN) .......................... 201820992926.7

(51) Int. Cl.
| | | |
|---|---|---|
| *G09F 9/30* | (2006.01) | |
| *G06F 3/041* | (2006.01) | |
| *G06F 1/16* | (2006.01) | |
| *B32B 7/12* | (2006.01) | |
| *C09J 133/10* | (2006.01) | |
| *C09J 133/04* | (2006.01) | |

(Continued)

(52) U.S. Cl.
CPC ............ *G09F 9/301* (2013.01); *G06F 1/1643* (2013.01); *G06F 1/1652* (2013.01); *G06F 3/0412* (2013.01); *B32B 7/12* (2013.01); *B32B 2457/20* (2013.01); *B32B 2457/208* (2013.01); *C09J 133/04* (2013.01); *C09J 133/08* (2013.01); *C09J 133/10* (2013.01); *C09J 133/12* (2013.01); *C09J 2203/318* (2013.01); *G02F 1/133305* (2013.01)

(58) Field of Classification Search
CPC . B32B 7/12; B32B 2457/20; B32B 2457/208; C09J 133/04; C09J 133/08; C09J 133/10; C09J 133/12; C09J 2203/318; G06F 1/1643; G06F 1/1652; G06F 3/0412; G06F 2203/04102; G06F 2203/04103; G09F 9/301; G02F 1/133305
See application file for complete search history.

(56) References Cited

U.S. PATENT DOCUMENTS

| | | | | |
|---|---|---|---|---|
| 2014/0160406 A1* | 6/2014 | Huh | ...................... | G02B 5/3033 349/96 |
| 2015/0004345 A1* | 1/2015 | Chaung | ..................... | B32B 7/14 428/41.7 |

(Continued)

FOREIGN PATENT DOCUMENTS

| | | | | |
|---|---|---|---|---|
| CN | 107216819 A | * | 9/2017 | ................ C09J 7/00 |
| WO | WO-2018034148 A1 | * | 2/2018 | ............. B32B 27/08 |

*Primary Examiner* — Eli D. Strah
(74) *Attorney, Agent, or Firm* — McDermott Will and Emery LLP

(57) ABSTRACT

A flexible display apparatus includes at least two components that are stacked, and at least one optical adhesive layer. Each optical adhesive layer is disposed between two adjacent components of the at least two components, and includes at least two adhesive layers stacked in a stacking direction of the at least two components. The at least two adhesive layers include at least one first adhesive layer and at least one second adhesive layer. One of the at least one first adhesive layer is adhered to one of the two adjacent components, and a storage modulus of each second adhesive layer is less than a storage modulus of each first adhesive layer.

12 Claims, 7 Drawing Sheets

(51) Int. Cl.
  *C09J 133/08* (2006.01)
  *C09J 133/12* (2006.01)
  *G02F 1/1333* (2006.01)

(56) References Cited

U.S. PATENT DOCUMENTS

2017/0309867 A1* 10/2017 Mun .................. H01L 51/5253
2019/0193374 A1*  6/2019 Yamasaki ............... G09F 9/301
2021/0031491 A1*  2/2021 Du ........................... B32B 7/12

* cited by examiner

FLEXIBLE DISPLAY APPARATUS

CROSS-REFERENCE TO RELATED APPLICATION

This application claims priority to Chinese Patent Application No. 201820992926.7, filed with the Chinese Patent Office on Jun. 26, 2018, titled "FLEXIBLE DISPLAY APPARATUS", which is incorporated herein by reference in its entirety.

TECHNICAL FIELD

The present disclosure relates to the field of display technologies, and in particular, to a flexible display apparatus.

BACKGROUND

With the development of wearable technologies, flexible display apparatuses are becoming more and more widely used in the wearable field.

SUMMARY

A flexible display apparatus is provided. The flexible display apparatus includes at least two components that are stacked, and at least one optical adhesive layer. Each optical adhesive layer is disposed between two adjacent components of the at least two components, and includes at least two adhesive layers stacked in a stacking direction of the at least two components. The at least two adhesive layers include at least one first adhesive layer and at least one second adhesive layer. One of the at least one first adhesive layer is adhered to one of the two adjacent components. A storage modulus of each second adhesive layer is less than a storage modulus of each first adhesive layer.

In some embodiments, an adhesive strength of each first adhesive layer is greater than an adhesive strength of each second adhesive layer.

In some embodiments, the at least one first adhesive layer includes a first adhesive sub-layer and a second adhesive sub-layer, and the at least one second adhesive layer is disposed between the first adhesive sub-layer and the second adhesive sub-layer. The first adhesive sub-layer is adhered to one of the two adjacent components, and the second adhesive sub-layer is adhered to another one of the two adjacent components.

In some embodiments, a thickness of each second adhesive layer is greater than each of at least one of a thickness of the first adhesive sub-layer or a thickness of the second adhesive sub-layer.

In some embodiments, the flexible display apparatus is bendable such that a portion of a surface of the second adhesive sub-layer away from the first adhesive sub-layer faces another portion of the surface of the second adhesive sub-layer away from the first adhesive sub-layer. A storage modulus of the second adhesive sub-layer is greater than a storage modulus of the first adhesive sub-layer.

In some embodiments, the at least one second adhesive layer includes at least two second adhesive layers. The at least one first adhesive layer further includes at least one third adhesive sub-layer. Each third adhesive sub-layer is disposed between corresponding two adjacent second adhesive layers of the at least two second adhesive layers. A storage modulus of each third adhesive sub-layer is less than each of at least one of the storage modulus of the first adhesive sub-layer or the storage modulus of the second adhesive sub-layer.

In some embodiments, an adhesive strength of each third adhesive sub-layer is less than each of at least one of an adhesive strength of the first adhesive sub-layer or an adhesive strength of the second adhesive sub-layer.

In some embodiments, the flexible display apparatus has at least one bendable region. In the at least two adhesive layers, a storage modulus of a portion of each adhesive layer located in the at least one bendable region is less than a storage modulus of a portion of a same adhesive layer located outside the at least one bendable region.

In some embodiments, the storage modulus of each first adhesive layer ranges from 30 KPa to 200 KPa. The storage modulus of each second adhesive layer ranges from 15 KPa to 80 KPa.

In some embodiments, an adhesive strength of each first adhesive layer is greater than or equal to 1000 gf/inch.

In some embodiments, a thickness of each first adhesive layer ranges from 2 μm to 50 μm. A thickness of each second adhesive layer ranges from 10 μm to 50 μm.

In some embodiments, a light transmittance of each first adhesive layer or each second adhesive layer is greater than 93%, and a haze thereof is less than 1%. In some other embodiments, light transmittances of each first adhesive layer and each second adhesive layer are greater than 93%, and hazes thereof are less than 1%.

In some embodiments, the at least two components that are stacked include a display panel, a polarizer and a cover plate that are sequentially stacked.

In some embodiments, the at least two components that are stacked further include a touch panel disposed between the display panel and the cover plate.

BRIEF DESCRIPTION OF THE DRAWINGS

In order to describe technical solutions in embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in some embodiments of the present disclosure will be described clearly and completely with reference to the accompanying drawings in some embodiments of the present disclosure. Obviously, the described embodiments are merely some but not all of embodiments of the present disclosure. All other embodiments made on the basis of the embodiments of the present disclosure by a person of ordinary skill in the art shall be included in the protection scope of the present disclosure.

Figure 1:
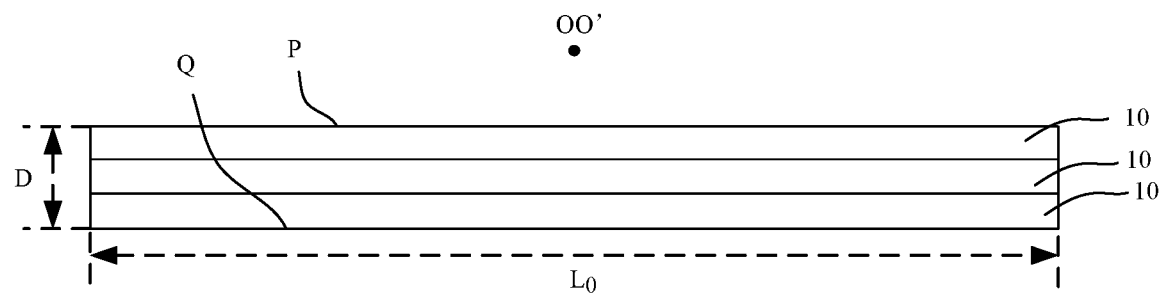
FIG. 1 is a cross-sectional diagram of a flexible display apparatus in the related art.
Figure 2:
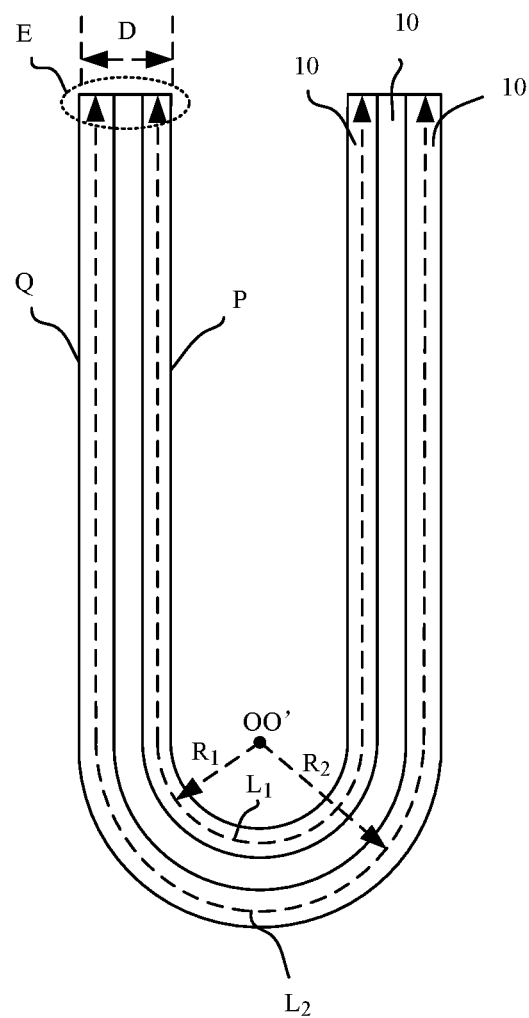
FIG. 2 is a schematic diagram of the flexible display apparatus shown in FIG. 1 in a bent state.

As shown in FIGS. 1 and 2, a flexible display apparatus usually includes a plurality of components 10 that are stacked, and has a certain thickness D. The flexible display apparatus may be bent around a bend centerline OO'. Here, the bend centerline OO' in FIGS. 1 and 2 is perpendicular to the drawings, and is shown by a dot in each drawing.

With reference to FIG. 1, the flexible display apparatus is in an unbent state, and a surface P of the flexible display apparatus close to the bend centerline OO' and a surface Q thereof away from the bend center line OO' are equal in length in a cross section perpendicular to the bend centerline OO', both of which are $L_0$.

As shown in FIG. 2, the flexible display apparatus is in a bent state. In the plurality of components 10 included in the flexible display apparatus, a bend radius $R_1$ of a component 10 closest to the bend centerline OO' is less than a bend radius $R_2$ of a component 10 farthest from the bend centerline OO'. Moreover, there is a connection force between any two adjacent components of the components 10 in the flexible display apparatus. Under an action of the connection force, a relative slipping between the two adjacent components 10 may not occur, and edge portions E of the components 10 in the flexible display apparatus are aligned with each other. In this case, the component 10 closest to the bend centerline OO' described above is compressed, and its length in the cross section perpendicular to the bend centerline OO' is reduced from $L_0$ to $L_1$. Wrinkles are easy to occur on the surface P of this component 10 close to the bend centerline OO'. Moreover, the component 10 farthest from the bend centerline OO' described above is stretched, and its length in the cross section perpendicular to the bend centerline OO' is increased from $L_0$ to $L_2$. Cracks are easy to occur on the surface Q of this component 10 away from the bend centerline OO'.

In addition, in the case where the flexible display apparatus is in the bent state, since different bend radii of the components 10 included in the flexible display apparatus lead to different lengths of the components 10 in the cross section perpendicular to the bend centerline OO', there is a tendency that a relative slipping occurs between two adjacent components 10, and a shear stress is generated at a connection interface between the two adjacent components 10, which leads to a risk of an interface separation in the flexible display apparatus in the bent state. Here, the term "interface separation" refers to a case where the connection interface between two adjacent components 10 in a flexible display apparatus is broken, which causes that the two adjacent components 10 are at least partially disconnected.

Figure 3:
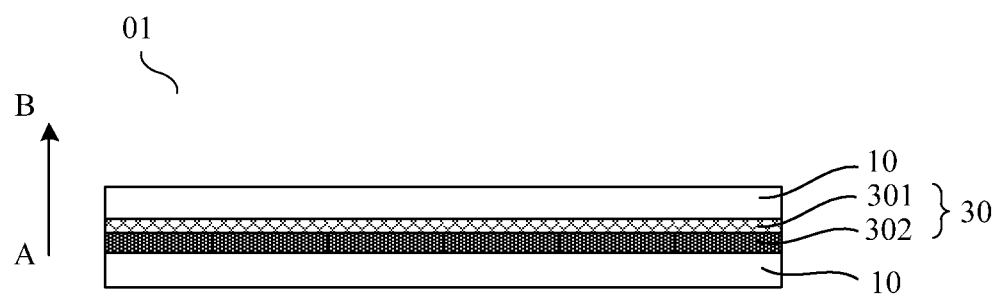
FIG. 3 is a cross-sectional diagram of a flexible display apparatus, in accordance with some embodiments.

Based on this, some embodiments of the present disclosure provide a flexible display apparatus 01. As shown in FIG. 3, the flexible display apparatus 01 includes at least two components 10 that are stacked, and at least one optical adhesive layer 30. Each optical adhesive layer 30 is disposed between two adjacent components 10 of the at least two components 10, and includes at least two adhesive layers stacked in a stacking direction AB of the at least two components 10. The at least two adhesive layers include at least one first adhesive layer 301 and at least one second adhesive layer 302, and one of the at least one first adhesive layer 301 is adhered to one of the two adjacent components 10. A storage modulus of each second adhesive layer 302 is less than a storage modulus of each first adhesive layer 301.

Here, the storage modulus is used to characterize an elastic deformation capability of a material. A material having a smaller storage modulus is more easily deformed and recovered than a material having a larger storage modulus. In each optical adhesive layer 30 described above, the storage modulus of each second adhesive layer 302 is less than the storage modulus of each first adhesive layer 301, and thus the at least one second adhesive layer 302 is more easily deformed and recovered relative to the at least one first adhesive layer 301.

In addition, the relationship between the adhesive strength and the storage modulus of the adhesive layer is described below. The adhesive strengths of a second adhesive layer 302 and a first adhesive layer 301 having different storage moduli are tested, and test conditions are as follows. The temperature is 25° C., a frequency of the separation force is 1 Hz, materials of films for forming the connection interfaces with the adhesive layers are both glass, and thicknesses of the adhesive layers are both 100 μm. Test results are shown in Table 1.

TABLE 1

| Name of the adhesive layer | Storage modulus (KPa) | Thickness (μm) | Materials of the films | Adhesive strength (gf/inch) |
|---|---|---|---|---|
| First adhesive layer | 200 | 100 | Glass | 2400 |
| Second adhesive layer | 39 | | | 680 |

The storage modulus of the first adhesive layer 301 used in the test is 200 KPa, and a tested adhesion strength of the first adhesive layer 301 is 2400 gf/inch. The storage modulus of the second adhesive layer 302 used is 39 KPa, and a tested adhesion strength of the second adhesive layer 302 is 680 gf/inch. Here, the term "adhesive strength" described above refers to a stress required to separate the adhesive layers described above from an adhered component 10, and is also referred to as a "bonding strength" or a "joint strength".

The second adhesive layer 302 has a smaller storage modulus than the storage modulus of the first adhesive layer 301, and thus is more easily deformed, that is, has a stronger fluidity. When the second adhesive layer 302 is peeled off from an adhered film, the second adhesive layer 302 has a larger deformation due to the stronger fluidity, and thus has a larger degree of dislocation. Therefore, the second adhesive layer 302 is easier to be peeled off. However, the first adhesive layer 301 has a smaller degree of dislocation, and thus the first adhesive layer 301 is difficult to be peeled off. Therefore, in the above test, an adhesive property of the first adhesive layer 301 having a larger storage modulus is superior to an adhesive property of the second adhesive layer 302 having a smaller storage modulus.

In the flexible display apparatus described above, one first adhesive layer 301 in the optical adhesive layer 30 is adhered to one of the two adjacent components 10. Relative to the second adhesive layer 302, the first adhesive layer 301 has a larger storage modulus and a better adhesive property, and thus a connection interface between the first adhesive layer 301 and the adhered component 10 is firmer. Therefore, the optical adhesive layer 30 has both an easy deformation performance and a better adhesive property.

Figure 4:
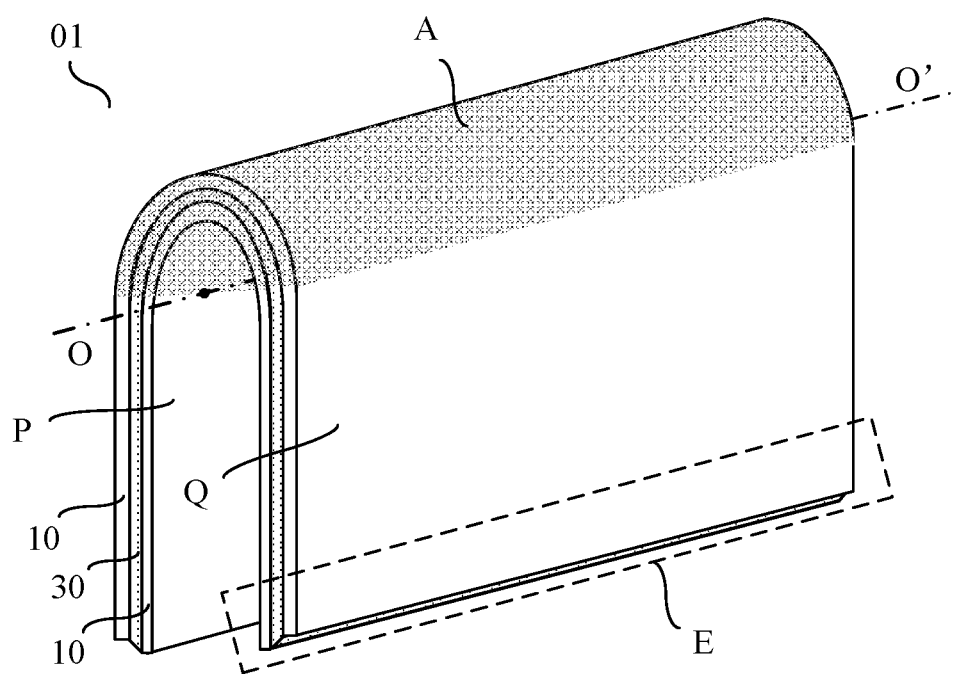
FIG. 4 is a schematic diagram of a flexible display apparatus in a bent state, in accordance with some embodiments.
Figure 5:
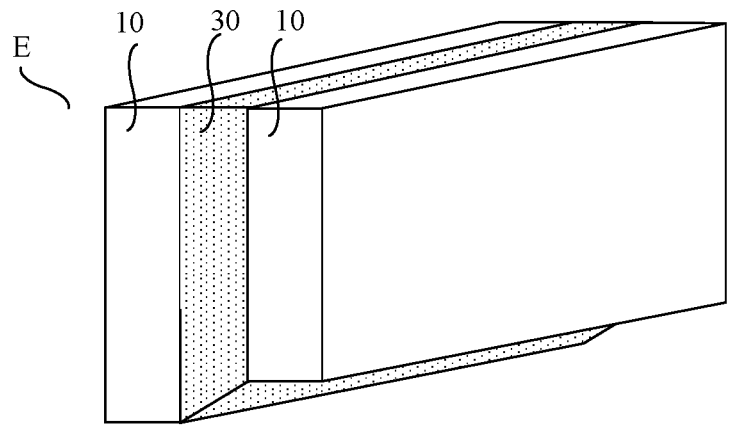
FIG. 5 is a schematic diagram showing an edge portion E in the flexible display apparatus shown in FIG. 4 after this portion is slipped, in accordance with some embodiments.

On this basis, with reference to FIGS. 4 and 5, the flexible display apparatus 01 is in the bent state, and a shear deformation of the optical adhesive layer 30 is easy to occur, so that dislocations of the two adjacent components 10 shown in FIG. 5 occur at the edge portion E of the flexible display apparatus, thereby reducing a degree of compression of the component 10 closest to the bend centerline OO' in the flexible display apparatus, and reducing a degree of stretching of the component 10 farthest from the bend centerline OO' in the flexible display apparatus. Therefore, a probability that the wrinkles occur on the surface P close to the bend centerline OO' of the component 10 closest to the bend centerline OO' in the flexible display apparatus is lowered, and a probability that the cracks occur on the surface Q far from the bend centerline OO' of the component 10 farthest from the bend centerline OO' in the flexible display apparatus is lowered. That is, a probability that the wrinkles occur on the flexible display apparatus 01 and a probability that the cracks occur on the flexible display apparatus 01 are reduced.

Moreover, in the case where the flexible display apparatus 01 is in the bent state, the shear deformation of the optical adhesive layer 30 occurs, which partially decouple the shear stress between the two adjacent components 10. That is, the shear stress received by the two adjacent components 10 is lowered, thereby reducing the risk of the interface separation in the flexible display apparatus 01.

In some embodiments, the storage modulus of each first adhesive layer 301 ranges from 30 KPa to 200 KPa. In this case, it may be avoided that the adhesive property of the first adhesive layer 301 is too poor due to a too small storage modulus thereof, thereby avoiding the interface separation in the flexible display apparatus 01. Moreover, it may be avoided that the deformation capability and a recovery capability of the first adhesive layer 301 are too poor due to a too large storage modulus thereof, thereby avoiding that the flexible display apparatus 01 is extremely difficult to be bent in a bending process and is extremely difficult to be recovered in an unfolding process.

In some embodiments, the storage modulus of each second adhesive layer 302 ranges from 15 KPa to 80 KPa. In this case, it may be avoided that the adhesive property of the second adhesive layer 302 is too poor due to a too small storage modulus thereof, thereby avoiding an adhesive failure of the flexible display apparatus 01. Moreover, it may be avoided that a desired decoupling effect of each optical adhesive layer 30 may not be achieved due to a too large storage modulus of the second adhesive layer 302.

For example, the storage modulus of each second adhesive layer 302 ranges from 15 KPa to 50 KPa.

In some embodiments, in the flexible display apparatus 01, an adhesive strength of each first adhesive layer 301 is greater than an adhesive strength of each second adhesive layer 302.

Since the adhesive strength of each first adhesive layer 301 is larger, the connection interface between each first adhesive layer 301 and the adhered component 10 is firmer, thereby reducing a probability of the adhesive failure of the flexible display apparatus 01 in the bending process, and further reducing the risk of the interface separation in the flexible display apparatus 01.

For example, the adhesive strength of each first adhesive layer 301 is greater than or equal to 1000 gf/inch.

Figure 6:
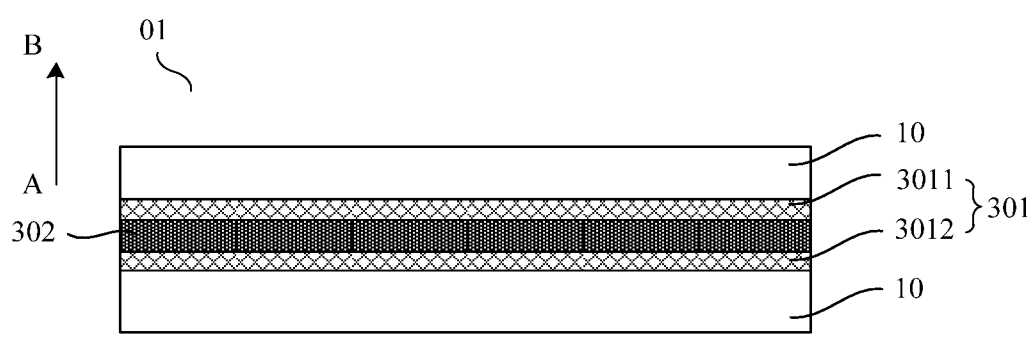
FIG. 6 is a cross-sectional diagram of another flexible display apparatus, in accordance with some embodiments.

In some embodiments, with reference to FIG. 6, the at least one first adhesive layer 301 of the optical adhesive layer 30 includes a first adhesive sub-layer 3011 and a second adhesive sub-layer 3012, and the at least one second adhesive layer 302 is disposed between the first adhesive sub-layer 3011 and the second adhesive sub-layer 3012. The first adhesive sub-layer 3011 is adhered to one of the two adjacent components 10, and the second adhesive sub-layer 3012 is adhered to another one of the two adjacent components 10.

In the flexible display apparatus 01 described above, since the first adhesive layer 3011 and the second adhesive sub-layer 3012 are adhered to the two adjacent components 10 respectively, and the first adhesive sub-layer 3011 and the second adhesive sub-layer 3012 both have good adhesive properties, the connection interface between the optical adhesive layer 30 and the two adjacent components 10 adhered thereto is firmer, thereby reducing the risk of the interface separation in the flexible display apparatus 01, increasing the bending reliability of the flexible display apparatus 01, and extending the service life thereof.

Based on the optical adhesive layer 30 shown in FIG. 6, in some embodiments, a thickness of each second adhesive layer 302 is greater than each of at least one of a thickness of the first adhesive sub-layer 3011 or a thickness of the second adhesive sub-layer 3012. For example, the thickness of each second adhesive layer 302 is greater than the thickness of the first adhesive sub-layer 3011. For another example, the thickness of each second adhesive layer 302 is greater than the thickness of the second adhesive sub-layer 3022. For another example, the thickness of each second adhesive layer 302 is greater than the thickness of the first adhesive sub-layer 3011, and the thickness of the second adhesive layer 302 is greater than the thickness of the second adhesive sub-layer 3012.

In this case, it may be ensured that the optical adhesive layer 30 is more easily deformed, and is more advantageous for a decoupling of the shear stress between two adjacent components 10, thereby simultaneously reducing the probability that the wrinkles occur on the flexible display apparatus 01, the probability that the cracks occur on the flexible display apparatus 01 and the probability that the interface separation occurs in the flexible display apparatus 01.

In addition, since each second adhesive layer 302 is more easily deformed and recovered, the fact that the thickness of each second adhesive layer 302 in the optical adhesive layer is greater than each of at least one of the thickness of the first adhesive sub-layer 3011 or the thickness of the second adhesive sub-layer 3012 may make the flexible display apparatus 01 easy to be bent in the bending process and easy to be recovered in the unfolding process.

In some embodiments, the thickness of each second adhesive layer 302 ranges from 10 μm to 50 μm.

In some embodiments, the thickness of the first adhesive sub-layer 3011 ranges from 2 μm to 50 μm. In some embodiments, the thickness of the second adhesive sub-layer 3012 ranges from 2 μm to 50 μm.

In this case, it may be avoided that an adhesive property of at least one of the first adhesive sub-layer 3011 or the second adhesive sub-layer 3012 is too poor due to a too small thickness thereof, thereby avoiding the interface separation in the flexible display apparatus 01. It may also be avoided that a thickness of the optical adhesive layer 30 is too large due to a too large thickness of at least one of the first adhesive sub-layer 3011 or the second adhesive sub-layer 3012, thereby avoiding a too large thickness of the flexible display apparatus 01.

In some examples, the thickness of the first adhesive sub-layer 3011 and the thickness of the second adhesive sub-layer 3012 range from 2 μm to 25 μm. In some other examples, the thickness of the first adhesive sub-layer 3011 and the thickness of the second adhesive sub-layer 3012 range from 2 μm to 10 μm.

In some embodiments, the thickness of the first adhesive sub-layer 3011 and the thickness of the second adhesive sub-layer 3012 are the same.

In some embodiments, the thickness of the first adhesive sub-layer 3011 and the thickness of the second adhesive sub-layer 3012 are set according to self-characteristics of two adjacent components 10 to which the optical adhesive layer 30 is adhered.

Figure 8:
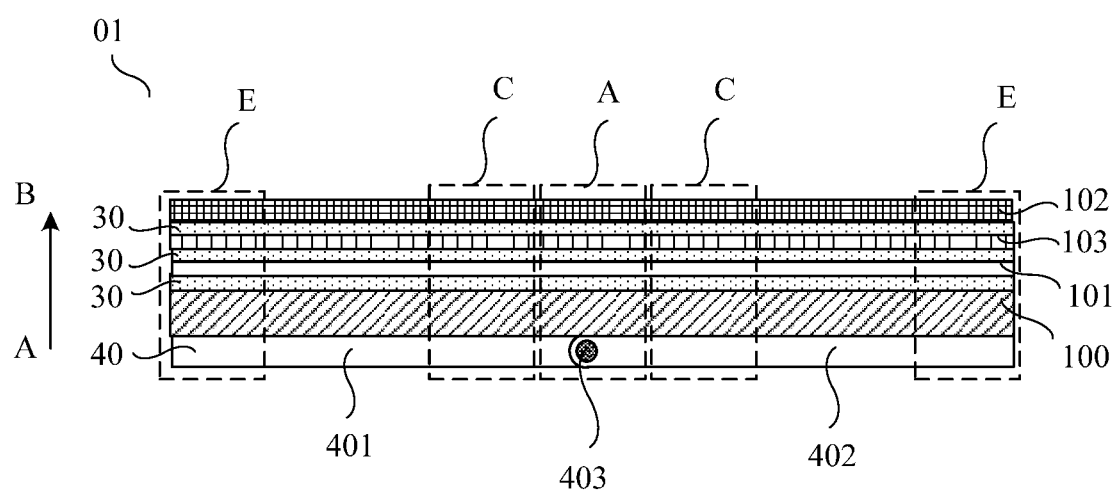
FIG. 8 is a cross-sectional diagram of yet another flexible display apparatus, in accordance with some embodiments.

For example, with reference to FIGS. 6 and 8, a component 10 to which the first adhesive sub-layer 3011 is adhered is a cover plate 102 and a component 10 to which the second adhesive sub-layer 3012 is adhered is a polarizer 101. Compared with the polarizer 101, the cover plate 102 is usually more difficult to be adhered since it includes fluorine. In this case, the thickness of the first adhesive sub-layer 3011 is set to be larger, which may improve a fastness of the adhesion of the first adhesive sub-layer 3011 to the cover plate 102. The polarizer 101 is easier to be adhered, and thus the thickness of the second adhesive sub-layer 3012 is set to be less than the thickness of the first adhesive sub-layer 3012, which may satisfy an adhesion fastness of the second adhesive sub-layer 3012 and make the thickness of the flexible display apparatus 01 smaller.

In some embodiments, with reference to FIG. 4, the flexible display apparatus 01 has at least one bendable region A. For example, the flexible display apparatus 01 is a smart watch or a smart bracelet, and the smart watch or the smart bracelet has bendable regions A. For another example, the flexible display apparatus 01 is a foldable mobile phone, and the foldable mobile phone is designed to be folded in half along an axis of symmetry of a screen. In this case, the foldable mobile phone has a bendable region A provided at the above axis of symmetry thereof.

With reference to FIG. 4, the flexible display apparatus 01 is in the bent state, and a bending stress will be generated in the bendable region A, thereby causing that a portion of the flexible display apparatus 01 located in the bendable region A is subjected to a greater stress than a portion of the flexible display apparatus 01 located outside the bendable region A.

Figure 7:
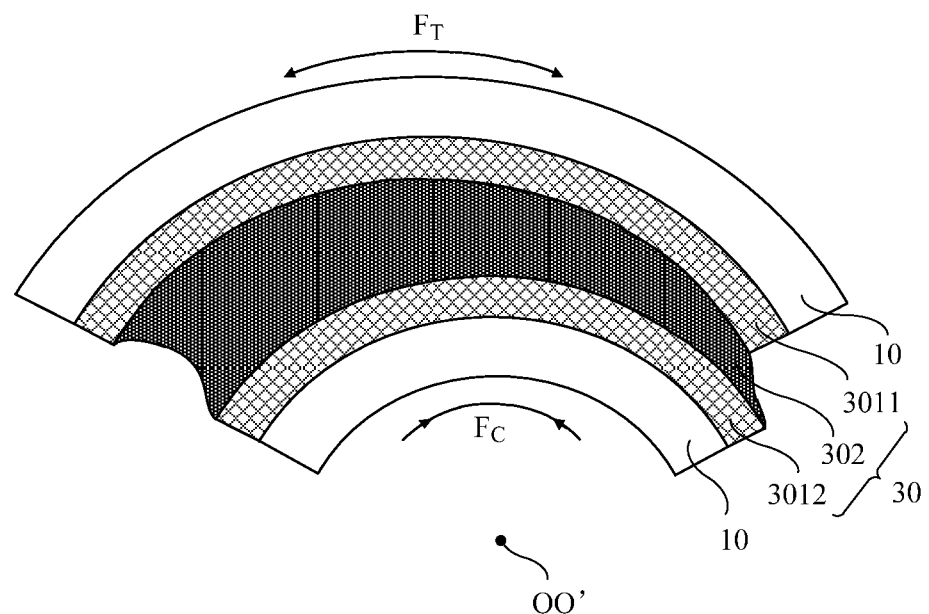
FIG. 7 is a partial cross-sectional diagram of a portion, which is located in a bendable region A, of the flexible display apparatus shown in FIG. 4, in accordance with some embodiments.

Based on the above force analysis, in some embodiments, with reference to FIGS. 4 and 7, a storage modulus of a portion of each of the at least two adhesive layer of the optical adhesive layer 30 located in the at least one bendable region A is less than a storage modulus of a portion of a same adhesive layer located outside the at least one bendable region A.

In this case, compared with the portion of the optical adhesive layer 30 located outside the at least one bendable region A, the portion located in the at least one bendable region A is more easily deformed. Therefore, a deformation of the portion of the optical adhesive layer 30 located in the at least one bendable region A is greater than a deformation of the portion of the optical adhesive layer 30 located outside the at least one bendable region A, thereby facilitating that the flexible display apparatus 01 is bent in the at least one bendable region A and is recovered in the unfolding process.

For example, with reference to FIG. 8, a storage modulus of a portion of the first adhesive sub-layer 3011 in the flexible display apparatus 01 located in the bendable region A is less than storage moduli of portions of the first adhesive sub-layer 3011 located in edge regions E, and is less than storage moduli of portions of the first adhesive sub-layer 3011 located in regions C adjacent to the bendable region A. For another example, a storage modulus of a portion of the second adhesive sub-layer 3012 in the flexible display apparatus 01 located in the bendable region A is less than storage moduli of portions of the second adhesive sub-layer 3012 located in the edge regions E, and is less than storage moduli of portions of the second adhesive sub-layer 3012 located in regions C adjacent to the bendable region A. In addition, in some embodiments, storage moduli of portions of an adhesive layer located in the regions C are less than storage moduli of portions of the same adhesive layer located in the edge regions E.

With continued reference to FIGS. 4 and 7, in a bendable region A, a stress received by a portion of the flexible display apparatus 01 close to the bend centerline OO' is a compressive stress $F_c$, and the wrinkles are easy to occur on a surface of the portion. In the bendable region A, a stress received by a portion of the flexible display apparatus 01 away from the bend centerline OO' is a tensile stress $F_T$, and the cracks are easy to occur on a surface of the portion.

Based on the above force analysis, in some embodiments, with reference to FIGS. 6 and 7, the flexible display apparatus is bendable such that a portion of a surface of the second adhesive sub-layer 3012 away from the first adhesive sub-layer 3011 faces another portion of the surface of the second adhesive sub-layer 3012 away from the first adhesive sub-layer 3011, and a storage modulus of the second adhesive sub-layer 3012 is greater than a storage modulus of the first adhesive sub-layer 3011. The description that the flexible display apparatus is bendable such that a portion of a surface of the second adhesive sub-layer 3012 away from the first adhesive sub-layer 3011 faces another portion of the surface of the second adhesive sub-layer 3012 away from the first adhesive sub-layer 3011 means that a portion of the flexible display apparatus 01 located in each bendable region A is bendable around a corresponding bend centerline OO', and the second adhesive sub-layer 3012 is disposed at a side of the first adhesive sub-layer 3011 close to the bend centerline OO'.

In addition, a tensile property of each component 10 in the flexible display apparatus 01 is better than a compressive property thereof. That is, relative to a probability that the cracks occur on the portion of the flexible display apparatus 01 close to the bend centerline OO', a probability that the wrinkles occur on the portion of the flexible display apparatus 01 close to the bend centerline OO' is greater. In the above case, the fact that the second adhesive sub-layer 3012 is disposed at the side of the first adhesive sub-layer 3011 close to the bend centerline OO' may enhance a compressive property of the portion of the flexible display apparatus 01 close to the bend centerline OO' and reduce the probability that the wrinkles occur on the flexible display apparatus 01 when the flexible display apparatus 01 is bent. Moreover, a fact that the storage modulus of the first adhesive sub-layer 3011 of the optical adhesive layer 30 away from the bend centerline OO' is made appropriately smaller ensures a tensile property of the optical adhesive layer 30 and facilitates a bending and an unfolding of each portion of the flexible display apparatus 01 located in a corresponding bendable region A.

In addition, the portion of the flexible display apparatus 01 close to the bend centerline OO' is prone to bubbles under a compression of the compressive stress. Therefore, the second adhesive sub-layer 3012 having a larger storage modulus is disposed in a portion of the flexible display apparatus 01 that is subjected to the compressive stress, which may improve an adhesive strength of a connection interface between the second adhesive sub-layer 3012 and the adhered component 10 and reduce a probability that the bubbles are generated on a surface of the flexible display apparatus 01 in the bending process.

In some embodiments, the storage modulus of the first adhesive sub-layer 3011 ranges from 30 KPa to 100 KPa. For example, the storage modulus of the first adhesive sub-layer 3011 ranges from 50 KPa to 100 KPa.

In some embodiments, the storage modulus of the second adhesive sub-layer 3012 ranges from 30 KPa to 200 KPa. For example, the storage modulus of the second adhesive sub-layer 3012 ranges from 50 KPa to 100 KPa.

In some embodiments, a dynamic cyclic bending test and a static bending test are performed on the flexible display apparatus 01 shown in FIG. 5, and test results are shown in Table 2.

In the dynamic cyclic bending test, the flexible display apparatus 01 is continuously bent a hundred thousand times at a temperature of −30° C., and the bend radius is 5 mm. In the static bending test, the flexible display apparatus 01 is placed in a static bent state at a temperature of 70° C. for two hundred and forty hours, and the bend radius is 5 mm.

In addition, the optical adhesive layer 30 in Examples 1 to 5 in Table 2 is tested under conditions that the temperature is 25° C., a peeling angle is 180°, a peeling speed is 300 mm/min, and a material of an adhered surface is glass. The storage moduli of each first adhesive sub-layer 3011, each second adhesive sub-layer 3012 and each second adhesive layer 302 in Examples 1 to 5 are storage moduli at the temperature of 25° C. In addition, as shown in FIG. 7, the second adhesive sub-layer 3012 in Examples 1 to 5 is disposed on a side of the first adhesive sub-layer 3011 close to the bend centerline OO'.

TABLE 2

|  |  | Example | | | | |
| --- | --- | --- | --- | --- | --- | --- |
|  |  | 1 | 2 | 3 | 4 | 5 |
| Glass transition temperature (° C.) | | 0 | −35 | −40 | −50 | −34 |
| Thickness (μm) | First adhesive sub-layer | 10 | 50 | 15 | 15 | 10 |
|  | Second adhesive layer | 30 | 80 | 20 | 20 | 30 |
|  | Second adhesive sub-layer | 10 | 50 | 15 | 15 | 10 |
| Storage modulus (KPa), 25° C. | First first adhesive layer | 60.5 | 68 | 250 | 23 | 120 |
|  | Second adhesive layer | 35.9 | 37 | 150 | 15 | 35 |
|  | Second adhesive sub-layer | 70 | 64 | 270 | 26 | 130 |
| Adhesive strength to a glass interface (gf/inch), 25° C. | | 2500 | 2300 | 3200 | 1300 | 2700 |
| Continuously bend two hundred thousand times, bend radius R = 5 mm, −30° C. | | Bendable region whitens | Interface separation | No problem | No problem | No problem |
| Remain static bent state for two hundred and forty hours, bend radius R = 5 mm, 70° C. | | No problem | Interface separation | Interface separation | Bubbles are generated | No problem |

In Example 3 and Example 4, thicknesses of the adhesive layers are the same. In the Example 3, since the storage modulus of the second adhesive sub-layer 3012 is greater than 30 KPa, bubbles are not generated on the surface of the flexible display apparatus 01. In the Example 4, since the storage modulus of the second adhesive sub-layer 3012 is less than 30 KPa, bubbles are generated on the surface of the flexible display apparatus 01. Therefore, it will be seen from the above test results that in a case where the storage modulus of the second adhesive sub-layer 3012 is too small, the bubbles may not be suppressed.

In addition, the storage modulus of the second adhesive layer 302 in the Example 3 is greater than 80 KPa, so that a deformation capability thereof is poor, which is disadvantageous for a relative slipping of two components 10 to which the optical adhesive layer 30 is adhered. Therefore, even if the storage moduli of the first adhesive sub-layer 3011 and the second adhesive sub-layer 3012 are both larger, and the adhesive properties thereof are both better, the interface separation still occurs in the flexible display apparatus 01.

In Example 5, in the dynamic cyclic bending test and the static bending test, a whitening of each bendable region and the interface separation do not occur in the flexible display apparatus 01, and the bubbles are not generated on the surface of the flexible display apparatus 01. In this case, the flexible display apparatus 01 performs well in the two bending tests described above.

Figure 9:
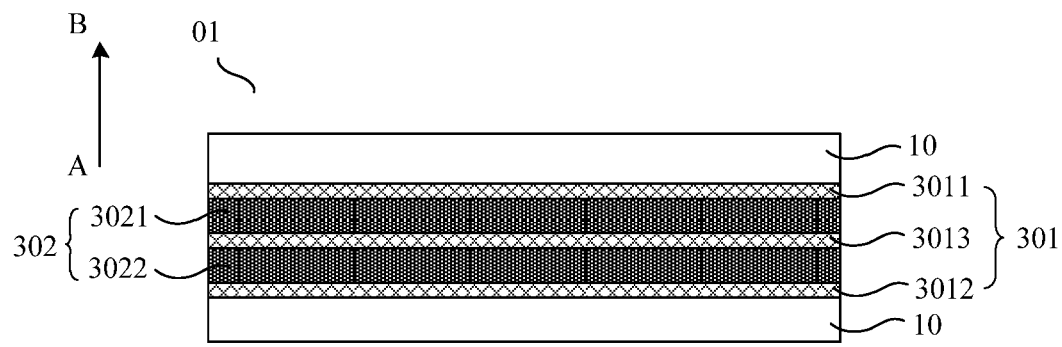
FIG. 9 is a cross-sectional diagram of yet another flexible display apparatus, in accordance with some embodiments.

In some embodiments, as shown in FIG. 9, the at least one second adhesive layer 302 in the optical adhesive layer 30 described above includes at least two second adhesive layers 302. The at least one first adhesive layer 301 further includes at least one third adhesive sub-layer 3013, and each third adhesive sub-layer 3013 is disposed between corresponding two adjacent second adhesive layers of the at least two second adhesive layers 302. For ease of description, the two adjacent second adhesive layers are indicated by the fourth adhesive sub-layer 3021 and the fifth adhesive sub-layer 3022.

In some embodiments, a storage modulus of each third adhesive sub-layer 3013 is less than each of at least one of the storage modulus of the first adhesive sub-layer 3011 or the storage modulus of the second adhesive sub-layer 3012. For example, the storage modulus of each third adhesive sub-layer 3013 is less than the storage modulus of the first adhesive sub-layer 3011. For another example, the storage modulus of each third adhesive sub-layer 3013 is less than the storage modulus of the second adhesive sub-layer 3012. For another example, the storage modulus of each third adhesive sub-layer 3013 is less than the storage modulus of the first adhesive sub-layer 3011, and is less than the storage modulus of the second adhesive sub-layer 3012.

In this case, the fourth adhesive sub-layer 3021 and the fifth adhesive sub-layer 3022 are adhered to both sides of each third adhesive sub-layer 3013 respectively, and the fourth adhesive sub-layer 3021 and the fifth adhesive sub-layer 3022 have good adhesive properties themselves compared with the components 10. Therefore, relative to the first adhesive sub-layer 3011 and the second adhesive sub-layer 3012, the storage modulus of each third adhesive sub-layer 3013 is set to be smaller, which may also ensure an adhesion fastness between each third adhesive sub-layer 3013 and an adhered second adhesive layer 302. In addition, the storage modulus of each third adhesive sub-layer 3013 is set to be smaller, which facilitates the bending and unfolding of the flexible display apparatus 01.

For example, an adhesive strength of each third adhesive sub-layer 3013 is less than each of at least one of an adhesive strength of the first adhesive sub-layer 3011 or an adhesive strength of the second adhesive sub-layer 3012.

In some embodiments, a light transmittance of each first adhesive layer 301 or each second adhesive layer 302 is greater than 93%, and a haze thereof is less than 1%. In some other embodiments, light transmittances of each first adhesive layer 301 and each second adhesive layer 302 are greater than 93%, and hazes thereof are less than 1%.

The flexible display apparatus 01 usually includes a display panel and components disposed on a light exit side of the display panel, such as the above polarizer and a touch panel. Light transmittances of the polarizer and the touch panel are usually 90% or more. In this case, the fact that the light transmittance of each first adhesive layer 301 or each second adhesive layer 302 in each optical adhesive layer 30 is greater than 93% or the fact that the light transmittances of each first adhesive layer 301 and each second adhesive layer 302 in each optical adhesive layer 30 are greater than 93% may avoid adverse effects of each optical adhesive layer 30 on a light transmittance of the flexible display apparatus 01.

In addition, the above haze refers to a decreased percentage of a transparency of a material due to a light scattering, and the greater the haze, the lower the transparency of the material. Therefore, the fact that the haze of each first adhesive layer 301 or each second adhesive layer 302 in each optical adhesive layer 30 is less than 1%, or the fact that the hazes of each first adhesive layer 301 and each second adhesive layer 302 in each optical adhesive layer 30 are less than 1% may avoid adverse effects of each optical adhesive layer 30 on a transparency of the display panel.

Figure 10:
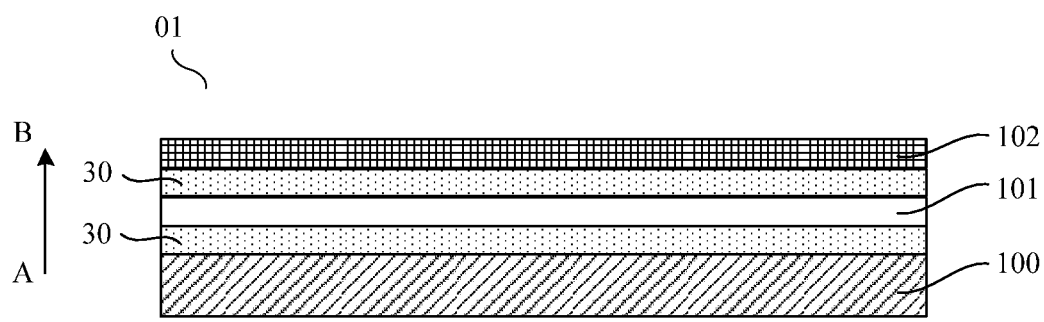
FIG. 10 is a cross-sectional diagram of yet another flexible display apparatus, in accordance with some embodiments.

In some embodiments, as shown in FIG. 10, the at least two components 10 that are stacked in the flexible display apparatus 01 include the display panel 100, the polarizer (POL) 101 and the cover plate 102 that are sequentially stacked.

For example, the above display panel 100 is an organic light-emitting diode (OLED) display panel. The OLED display panel includes a flexible base, a plurality of pixel circuit structures arranged in an array on the flexible base and a plurality of OLED light-emitting devices disposed on a side of the plurality of pixel circuit structures facing away from the flexible base. The plurality of pixel circuit structures are disposed in one-to-one correspondence with the plurality of OLED light-emitting devices.

For example, the above cover plate 102 is a cover film made of a resin material or a cover glass made of a flexible glass material.

In a case where the flexible display apparatus 01 has the structure shown in FIG. 10, for example, an optical adhesive layer 30 is disposed between one pair of two adjacent components 10. For example, an optical adhesive layer 30 is disposed between the display panel 100 and the polarizer 101, or an optical adhesive layer 30 is disposed between the polarizer 101 and the cover plate 102. As another example, an optical adhesive layer 30 is disposed between each two adjacent components 10 of the at least two components 10 that are stacked described above. That is, an optical adhesive layer 30 is disposed between the display panel 100 and the polarizer 101, and an optical adhesive layer 30 is disposed between the polarizer 101 and the cover plate 102.

Figure 11:
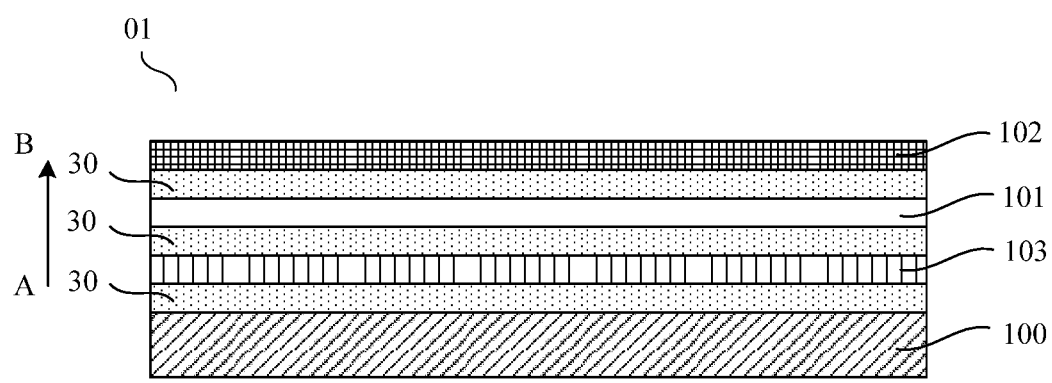
FIG. 11 is a cross-sectional diagram of yet another flexible display apparatus, in accordance with some embodiments.
Figure 12:
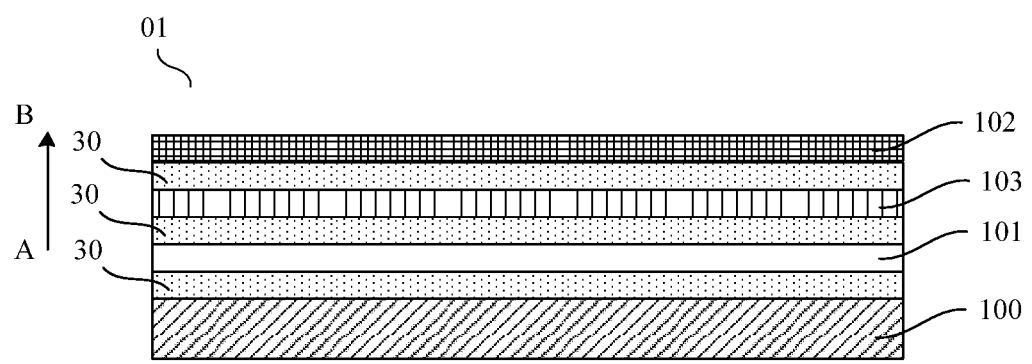
FIG. 12 is a cross-sectional diagram of yet another flexible display apparatus, in accordance with some embodiments.

In some other embodiments, as shown in FIGS. 11 and 12, the at least two components 10 that are stacked in the flexible display apparatus 01 further include a touch panel 103 disposed between the display panel 100 and the cover plate 102 described above.

In this case, a stacking order of the touch panel 103 and the polarizer 101 may be set according to actual needs. For example, with reference to FIG. 11, the at least two components 10 that are stacked in the flexible display apparatus 01 include the display panel 100, the touch panel 103, the polarizer 101 and the cover plate 102 that are sequentially stacked. For another example, with reference to FIG. 12, the at least two components 10 that are stacked in the flexible display apparatus 01 include the display panel 100, the polarizer 101, the touch panel 103 and the cover plate 102 that are sequentially stacked.

In a case where the flexible display apparatus 01 has the structure shown in FIG. 11, for example, an optical adhesive layer 30 is disposed between one pair of two adjacent components 10. For example, an optical adhesive layer 30 is disposed between the polarizer 101 and the cover plate 102, or an optical adhesive layer 30 is disposed between the polarizer 101 and the touch panel 103, or an optical adhesive layer 30 is disposed between the display panel 100 and the touch panel 103.

In some other examples, optical adhesive layers 30 are disposed between any two pairs of two adjacent components 10 of the at least two components 10 that are stacked described above, respectively. For example, optical adhesive layers 30 are disposed between the display panel 100 and the touch panel 103, and between the touch panel 103 and the polarizer 101, respectively. For another example, optical adhesive layers 30 are disposed between the display panel 100 and the touch panel 103, and between the polarizer 101 and the cover plate 102, respectively. For another example, optical adhesive layers 30 are disposed between the touch panel 103 and the polarizer 101, and between the polarizer 101 and the cover plate 102, respectively.

In some other examples, an optical adhesive layer 30 is disposed between each two adjacent components 10 of the at least two components 10 that are stacked described above. That is, an optical adhesive layer 30 is disposed between the display panel 100 and the touch panel 103, an optical adhesive layer 30 is disposed between the touch panel 103 and the polarizer 101, and an optical adhesive layer 30 is disposed between the polarizer 101 and the cover plate 102.

In a case where the flexible display apparatus 01 has the structure shown in FIG. 12, for example, an optical adhesive layer 30 is disposed between one pair of two adjacent components 10 of the at least two components 10 that are stacked described above. For another example, optical adhesive layers 30 are disposed between any two pairs of two adjacent components 10 of the at least two components 10 that are stacked described above, respectively. For another example, an optical adhesive layer 30 is disposed between each two adjacent components 10 of the at least two components 10 that are stacked described above. Specific arrangements of each optical adhesive layer 30 and the adhered components 10 are not listed one by one here.

Figure 13:
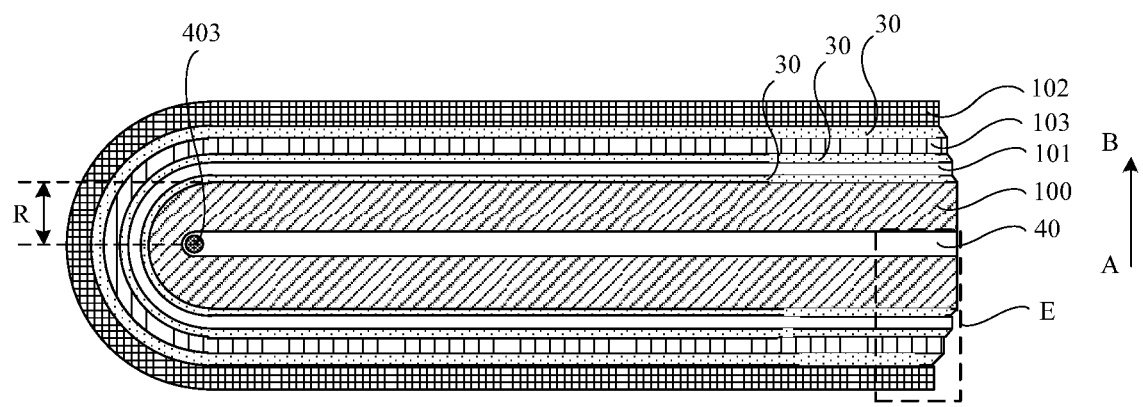
FIG. 13 is a schematic diagram of the flexible display apparatus shown in FIG. 8 in a bent state, in accordance with some embodiments.

In some embodiments, as shown in FIGS. 8 and 13, the flexible display apparatus 01 is a foldable mobile phone. The foldable mobile phone includes a mobile phone middle frame 40, the display panel 100, the polarizer 101, the touch Panel 103 and the cover plate 102 that are sequentially stacked. The foldable mobile phone further includes an optical adhesive layer 30 disposed between the display panel 100 and the polarizer 101, an optical adhesive layer 30 disposed between the polarizer 101 and the touch panel 103, and an optical adhesive layer 30 disposed between the touch panel 103 and the cover plate 102.

The mobile phone middle frame 40 includes a first middle sub-frame 401 and a second middle sub-frame 402. The first middle sub-frame 401 is connected to a left half of the display panel 100, and the second middle sub-frame 402 is connected to a right half of the display panel 100. The mobile phone middle frame 40 further includes an axis of rotation 403, and the first middle sub-frame 401 and the second middle sub-frame 402 are hinged by an axis of rotation 403. The foldable mobile phone has a bendable region A located at the axis of rotation 403, and a portion of the foldable mobile phone located in the bendable region A may be bent around the axis of rotation 403.

The foldable mobile phone in a bent state is as shown in FIG. 13. each two adjacent components of the display panel 100, the polarizer 101, the touch panel 103 and the cover plate 102 are provided with an optical adhesive layer 30 therebetween, a shear deformation of the optical adhesive layer 30 between two adjacent components occurs in a case where the foldable mobile phone is in the bent state, so that a stepped dislocation of the above components occurs at the edge portion E of the foldable mobile phone. Thus, a degree of compression of the display panel 100 close to the axis of rotation 403 is lowered, so that a compressive stress received by the display panel 100 is lowered, thereby reducing a probability that the wrinkles occur on the foldable mobile phone. Moreover, a degree of stretching of the cover plate 102 away from the axis of rotation 403 is also lowered, so that a tensile stress received by the cover plate 102 is lowered, thereby reducing a probability that the cracks occur on the foldable mobile phone. In addition, each optical adhesive layer 30 described above decouples a shear stress between the two components adhered thereto, thereby reducing a risk of an interface separation in the foldable mobile phone.

Here, a bend radius R of the foldable mobile phone described above ranges from 1 mm to 6 mm. In a case where the bend radius R of the foldable mobile phone is less than 1 mm, the thickness of the flexible display apparatus 01 is required to be very small, and requirements of a manufacturing process are required to be high. In a case where the bend radius R is greater than 6 mm, the thickness of the flexible display apparatus 01 after bending is larger, which is disadvantageous for improving an appearance of the above foldable mobile phone.

Figure 14:
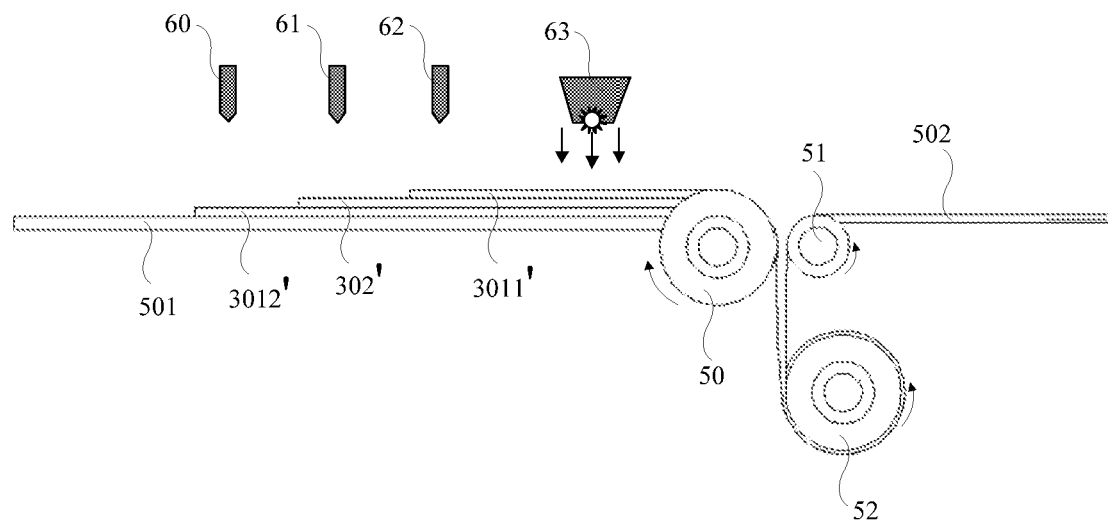
FIG. 14 is a schematic structural diagram of an apparatus for manufacturing an optical adhesive layer, in accordance with some embodiments.
Figure 15:
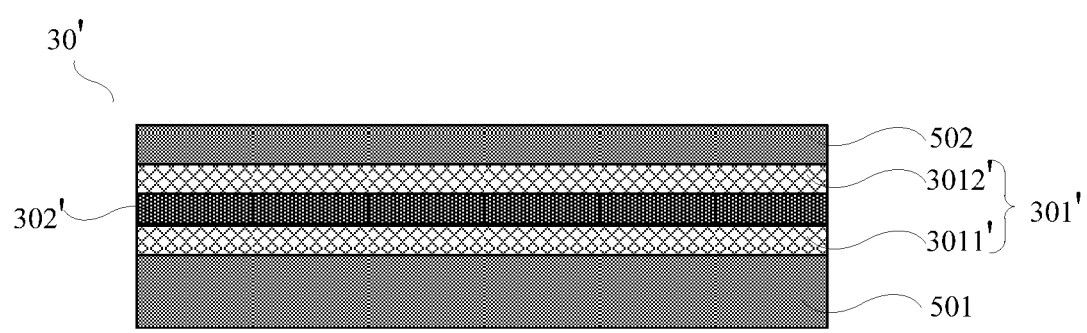
FIG. 15 is a cross-sectional diagram of an optical adhesive layer, in accordance with some embodiments.

In some embodiments, as shown in FIG. 14, an apparatus for manufacturing an optical adhesive layer shown in FIG. 14, and this apparatus is used to manufacture the optical adhesive layer 30' shown in FIG. 15. The optical adhesive layer 30' includes a heavy release film 501, a second adhesive sub-layer 3012', a second adhesive layer 302', a first adhesive sub-layer 3011' and a light release film 502 that are sequentially stacked. The storage modulus of the second adhesive sub-layer 3012' is greater than the storage modulus of the first adhesive sub-layer 3011'. Here the optical adhesive layer 30' and the optical adhesive layer 30 in the flexible display apparatus are in different states, and to differentiate the two layers, the adhesive layers in the optical adhesive layer 30' shown in FIG. 15 have different marks from corresponding adhesive layers in the optical adhesive layer 30 of the flexible display apparatus. In addition, the optical adhesive layer 30' refers to an optical adhesive layer 30' that is currently unused, while the optical adhesive layer 30 refers to the optical adhesive layer that has been used in the flexible display apparatus.

As shown in FIG. 14, the apparatus for manufacturing the optical adhesive layer includes a first roller 50, a second roller 51 and a third roller 52. The first roller 50 is configured to wind the heavy release film 501 and drive the heavy release film 501 to move through rolling, and the second roller 51 is configured to wind the light release film 502 and drive the light release film 502 to move through rolling. Rolling directions of the first roller 50 and the second roller are opposite. For example, the first roller 50 shown in FIG. 14 rolls in a clockwise direction, and the second roller 51 rolls in a counterclockwise direction. In this case, the heavy release film 501 moves toward the right, and the light release film 502 moves toward the left.

The apparatus for manufacturing the optical adhesive layer further includes a second adhesive sub-layer jet 60, a second adhesive layer jet 61, a first adhesive sub-layer jet 62 and a curing device 63 that are sequentially disposed from left to right in a moving direction of the heavy release film 501. The second adhesive sub-layer jet 60 is configured to form a second adhesive sub-layer 3012' on the heavy release film 501. The second adhesive layer jet 61 is configured to form a second adhesive layer 302' on the second adhesive sub-layer 3012'. The first adhesive sub-layer jet 62 is configured to form a first adhesive sub-layer 3011' on the second adhesive layer 302'. The curing device 63 is configured to cure the three adhesive layers formed on the heavy release film 501. The third roller 52 is configured to wind and roll up the heavy release film 501 and the three adhesive layers cured thereon and the light release film 502. The first adhesive sub-layer 3011' is contact with the light release film 502.

It will be noted that in the embodiments of the present disclosure, orientation terms such as "left" and "right" are defined according to orientations in which some components are placed in the drawings, such as the apparatus for manufacturing an optical adhesive layer, is schematically placed. It will be understood that these directional terms are relative concepts that are used for relative description and clarification, which may vary accordingly depending on the orientation in which the above components are placed.

In some embodiments, the optical adhesive layer 30' shown in FIG. 15 is manufactured by using the following method of manufacturing an optical adhesive layer.

With reference to FIG. 14, the first roller 50 is rolled, and the first adhesive sub-layer jet 60, the second adhesive layer jet 61 and the second adhesive sub-layer jet 62 sequentially apply corresponding adhesive layers to a moving heavy release film 501, and the second adhesive sub-layer 3012', the second adhesive layer 302' and the first adhesive sub-layer 3011' are sequentially formed on the heavy release film 501.

The above three adhesive layers are cured by using the curing device 63. It will be noted that, in this step, a curing may strengthen connections among the adhesive layers, so that the second adhesive sub-layer 3012', the second adhesive layer 302' and the first adhesive sub-layer 3011' form an integrated stacked structure.

The second roller 51 rolls in a direction opposite to the rolling direction of the first roller 50, and drives the light release film 502 to move.

The third roller 52 is rolled, and the light release film 502 and the heavy release film 501 and the adhesive layers formed thereon are wound and rolled up, so that the light release film 502 is attached to the first adhesive sub-layer 3011', so as to form the optical adhesive layer 30' shown in FIG. 15.

In some embodiments, the three adhesive layers are cured by a UV curing method. As another example, the above three adhesive layers are cured by a thermal curing method.

It will be noted that the release film is a special film that is not easily adhered, and the adhesion of the adhesive layer to the release film after contact with the release film is extremely small or even zero. In each optical adhesive layer 30 described above, the heavy release film 501 and the light release film 502 mainly serve to protect an adhesive surface of each optical adhesive layer 30 and prevent each optical adhesive layer 30 from being adhered before it is used. In a process of manufacturing a flexible display apparatus by using the optical adhesive layer 30', it is necessary to peel off the heavy release film 502 and the light release film 502. For example, the light release film 502 is peeled off first. As another example, the heavy release film 501 is peeled off first.

It will also be noted that a thickness and a peeling force of the heavy release film 501 are greater than a thickness and a peeling force of the light release film 502. For example, at least one of the heavy release film 501 or the light release film 502 described above is made of polyethylene terephthalate.

In some embodiments, components for manufacturing the first adhesive sub-layer 3011', the second adhesive sub-layer 3012' and the second adhesive layer 302' described above each include at least one copolymer monomer, a crosslinking agent and an initiator. It will be noted that a copolymer is prepared by the copolymerization of the at least one copolymer monomer and the crosslinking agent described above under an action of the initiator (i.e., the copolymer monomer is cured), and the copolymer prepared is an adhesive layer.

It will be noted that the at least one copolymer monomer forming the adhesive layer includes at least one of an acrylic resin, a urethane resin, an epoxy polyester resin or a silicone resin. For example, the copolymer monomer is an acrylic resin.

In some embodiments, the acrylic resin includes a monomer mixture of an acrylic copolymer having a hydroxyl group. The monomer mixture includes an acrylate having a hydroxyl group and a copolymer monomer. The acrylate having a hydroxyl group is different from the copolymer monomer.

A material of the acrylate having a hydroxyl group will be described below.

For example, the acrylate having a hydroxyl group includes at least one of a (meth) acrylate having a C1 to C20 alkyl group having at least one hydroxyl group, a (meth) acrylate having a C5 to C20 cycloalkyl group having at least one hydroxyl group and a (meth) acrylate having a C6 to C20 aryl group having at least one hydroxyl group.

For example, a (meth) acrylate having a hydroxyl group includes at least one of 2-hydroxyethyl (meth) acrylate, 4-hydroxybutyl (meth) acrylate, 2-hydroxybutyl (meth) acrylate, 2-hydroxybutyl (meth) acrylate and 6-hydroxyhexyl (meth) acrylate.

A (meth) acrylate monomer having a C1 to C5 alkyl group having at least one hydroxyl group may further improve the adhesive properties of the first adhesive layer 301' and the second adhesive layer 302'. In order to reduce a haze of each optical adhesive layer 30' while improving the adhesive property of the optical adhesive layer 30', the (meth) acrylate monomer having a hydroxyl group in base materials of each adhesive layer may be in a range of from 5% by weight (wt %) to 40% by weight (wt %).

A material of the at least one copolymer monomer will be described below.

The at least one copolymer monomer in the monomer mixture described above includes at least one of a (meth) acrylic acid alkyl ester monomer, a monomer having fluorinated ethylene, a monomer having fluorinated propylene, a monomer having an amine group, a monomer having an amide group, a monomer having an alkoxy group, a monomer having a phosphate group, a monomer having a sulfonic acid group, a monomer having a phenyl group or a monomer having a silane group.

It will also be noted that the initiator needs to initiate a polymerization of the at least one copolymer monomer under corresponding conditions. The above initiator is, for example, a photopolymerization initiator. In this case, the manufacturing components are irradiated by using a UV curing device, so that the manufacturing components are cured to form the adhesive layers. As another example, the initiator is a thermal polymerization initiator. In this case, the manufacturing components are heated by using a heat curing device, so that the manufacturing components are cured to form the adhesive layers.

In some embodiments, the storage modulus of each adhesive layer may be adjusted by adjusting an amount of the initiator in the above manufacturing components. In some embodiments, the storage modulus of each adhesive layer may be adjusted by adjusting a curing time. The optical adhesive layer 30' in FIG. 15 is taken as an example. The storage modulus of the second adhesive sub-layer 3012' is greater than the storage modulus of the first adhesive sub-layer 3011', and the storage modulus of the first adhesive sub-layer 3011' is greater than the storage modulus of the second adhesive layer 302'.

For example, a content of the initiator in manufacturing components for forming the second adhesive sub-layer 3012' is made greater than a content of the initiator in manufacturing components for forming the first adhesive sub-layer 3011'. Moreover, the content of the initiator in the manufacturing components for forming the first adhesive sub-layer 3011' is made greater than a content of the initiator in manufacturing components for forming the second adhesive layer 302'.

For example, a curing time of the manufacturing components for forming the second adhesive sub-layer 3012' is made greater than a curing time of the manufacturing components for forming the first adhesive sub-layer 3011'. Moreover, a curing time of the first adhesive sub-layer 3011' is made greater than a curing time of the second adhesive layer 302'.

In some embodiments, as shown in FIG. 14, the apparatus for manufacturing an optical adhesive layer is used to manufacture the optical adhesive layer 30' shown in FIG. 15 by using the method of manufacturing an optical adhesive layer. A process of manufacturing the optical adhesive layer 30' will be described below.

The manufacturing components of the adhesive layers in the optical adhesive layer 30 include: a monomer for forming a (meth) acrylic copolymer having a hydroxyl group, for example, 2-ethylhexyl acrylate (EHA), 4-hydroxybutyl acrylate (HBA) and 2-hydroxyethyl acrylate (HEA); an initiator, for example, a photopolymerization initiator 1: 2,2-dimethoxy-2-phenylacetophenone and a photopolymerization initiator 2: 1-hydroxycyclohexyl phenyl ketone; and a crosslinking agent: 1,6-hexanediol diacrylate.

The process of manufacturing the optical adhesive layer 30' is as follows.

100 parts by weight of a monomer mixture including 65 wt % of 2-ethylhexyl acrylate and 35 wt % of 4-hydroxybutyl acrylate, 4 parts by weight of organic nanoparticles, and 0.005 part by weight of photopolymerization initiator 1 are fully mixed in a glass vessel to obtain a mixture A. Next, after dissolved oxygen in the glass vessel is replaced with nitrogen, the mixture A is partially polymerized through an irradiation of UV light by using a low pressure lamp. The partially polymerized mixture A has a viscosity of approximately 2.000 cPs, and includes a (meth) acrylic polymer (prepolymer) having a hydroxyl group, a monomer, and an organic nanomaterial. It will be noted that in this case, since the mixture A is partially polymerized, it still has a certain fluidity.

Next, 5 parts by weight of the photopolymerization initiator 2 relative to 100 parts by weight of the above monomer mixture is mixed into the above partially polymerized mixture A to obtain a mixture B.

The above mixture B is coated onto the heavy release film 501 through the second adhesive sub-layer jet 60, the second adhesive layer jet 61 or the first adhesive sub-layer jet 62 in FIG. 11.

The mixture B coated on the heavy release film 501 is irradiated by the UV light by using a lamp for six minutes to obtain an optical adhesive layer 30'.

For example, a glass transition temperature of each optical adhesive layer 30 in the flexible display apparatus 01 is lower than −30° C. For example, the glass transition temperature described above is in a range of −40° C. to −85° C. In this case, the flexible display apparatus 01 has a good bending property in a low temperature environment, and it may still be bent in an environment where the temperature is lower than −40° C. to −85° C., thereby enabling the flexible display apparatus 01 to be bent in a larger temperature range.

In the above description of the embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A flexible display apparatus, comprising:
   at least two components that are stacked; and
   at least one optical adhesive layer, wherein each optical adhesive layer is disposed between two adjacent components of the at least two components, and includes
   a first adhesive layer and a second adhesive layer; the first adhesive layer includes a first adhesive sub-layer, a second adhesive sub-layer and a third adhesive sub-layer; the second adhesive layer includes a fourth adhesive sub-layer and a fifth adhesive sub-layer;
   the first adhesive sub-layer is adhered to one of the two adjacent components; the second adhesive sub-layer is adhered to another of the two adjacent components; the fourth adhesive sub-layer and the fifth adhesive sub-layer are disposed between the first adhesive sub-layer and the second adhesive sub-layer; the third adhesive sub-layer is disposed between the fourth adhesive sub-layer and the fifth adhesive sub-layer; and
   a storage modulus of each of the fourth adhesive sub-layer and the fifth adhesive sub-layer is less than a storage modulus of each of the first adhesive sub-layer, the second adhesive sub-layer and the third adhesive sub-layer, and
   a storage modulus of the third adhesive sub-layer is less than a storage modulus of each of the first adhesive sub-layer and the second adhesive sub-layer.

2. The flexible display apparatus according to claim 1, wherein an adhesive strength of each of the first adhesive sub-layer, the second adhesive sub-laver or the third adhesive sub-layer is greater than an adhesive strength of each of the fourth adhesive sub-layer or the fifth adhesive sub-layer.

3. The flexible display apparatus according to claim 1, wherein a thickness of each of the fourth adhesive sub-layer or the fifth adhesive sub-layer is greater than a thickness of each of the first adhesive sub-layer and the second adhesive sub-layer.

4. The flexible display apparatus according to claim 1, wherein the flexible display apparatus is bendable such that a portion of a surface of the second adhesive sub-layer away from the first adhesive sub-layer faces another portion of the surface of the second adhesive sub-layer away from the first adhesive sub-layer, and a storage modulus of the second adhesive sub-layer is greater than a storage modulus of the first adhesive sub-layer.

5. The flexible display apparatus according to claim 1, wherein an adhesive strength of the third adhesive sub-layer is less than an adhesive strength of each of the first adhesive sub-layer or the second adhesive sub-layer.

6. The flexible display apparatus according to claim 1, wherein the flexible display apparatus has at least one bendable region,
   a storage modulus of a portion of each of the first adhesive sub-layer, the second adhesive sub-layer, the third adhesive sub-layer, the fourth adhesive sub-layer or the fifth adhesive sub-layer located in the at least one bendable region is less than a storage modulus of a portion of a same adhesive sub-layer located outside the at least one bendable region.

7. The flexible display apparatus according to claim 1, wherein
   a storage modulus of each of the first adhesive sub-layer, the second adhesive sub-layer or the third adhesive sub-layer ranges from 30 KPa to 200 KPa; and
   a storage modulus of each of the fourth adhesive sub-layer or the fifth adhesive sub-layer ranges from 15 KPa to 80 KPa.

8. The flexible display apparatus according to claim 2, wherein an adhesive strength of each of the first adhesive sub-layer, the second adhesive sub-layer or the third adhesive sub-layer is greater than or equal to 1000 gf/inch.

9. The flexible display apparatus according to claim 1, wherein
   a thickness of each of the first adhesive sub-layer, the second adhesive sub-layer or the third adhesive sub-layer ranges from 2 μm to 50 μm; and
   a thickness of each of the fourth adhesive sub-layer or the fifth adhesive sub-layer ranges from 10 μm to 50 μm.

10. The flexible display apparatus according to claim 1, wherein
   a light transmittance of each of the first adhesive sub-layer, the second adhesive sub-layer or the third adhesive sub-layer is greater than 93%, and a haze thereof is less than 1%; or, each of the fourth adhesive sub-layer or the fifth adhesive sub-layer is greater than 93%, and a haze thereof is less than 1%; or
   the light transmittances of each of the first adhesive sub-layer, the second adhesive sub-layer or the third adhesive sub-layer is greater than 93%, and a haze thereof is less than 1%; and, each of the fourth adhesive sub-layer or the fifth adhesive sub-layer is greater than 93%, and hazes thereof is less than 1%.

11. The flexible display apparatus according to claim 1, wherein the at least two components that are stacked include a display panel, a polarizer and a cover plate that are sequentially stacked.

12. The flexible display apparatus according to claim 11, wherein the at least two components that are stacked further include a touch panel disposed between the display panel and the cover plate.

* * * * *